United States Patent
Shah et al.

(10) Patent No.: US 8,352,722 B2
(45) Date of Patent: Jan. 8, 2013

(54) METHOD AND SYSTEM FOR A PLATFORM LEVEL DATA MODEL AND MESSAGES FOR TRANSFERRING SMBIOS STRUCTURES AND DATA

(75) Inventors: Hemal V. Shah, Trabuco Canyon, CA (US); Stephen Hurd, Lake Forest, CA (US); Robert R. Swindell, Norco Hills, CA (US)

(73) Assignee: Broadcom Corporation, Irvine, CA (US)

( * ) Notice: Subject to any disclaimer, the term of this patent is extended or adjusted under 35 U.S.C. 154(b) by 913 days.

(21) Appl. No.: 12/045,855

(22) Filed: Mar. 11, 2008

(65) Prior Publication Data

US 2009/0019278 A1 Jan. 15, 2009

Related U.S. Application Data

(60) Provisional application No. 60/949,177, filed on Jul. 11, 2007.

(51) Int. Cl.
*G06F 13/14* (2006.01)
*G06F 15/177* (2006.01)
*G06F 13/10* (2006.01)
*G06F 13/38* (2006.01)

(52) U.S. Cl. ............... 713/100; 713/1; 713/2; 709/217; 709/219

(58) Field of Classification Search .................. 713/1, 2, 713/100
See application file for complete search history.

(56) References Cited

U.S. PATENT DOCUMENTS

| | | | |
|---|---|---|---|
| 7,747,848 B1 * | 6/2010 | Nallagatla et al. | 713/2 |
| 2005/0132084 A1 * | 6/2005 | Cheng et al. | 709/233 |
| 2008/0005222 A1 * | 1/2008 | Lambert et al. | 709/203 |
| 2008/0126586 A1 * | 5/2008 | Shih | 710/10 |
| 2008/0147828 A1 * | 6/2008 | Enstone et al. | 709/220 |
| 2008/0201572 A1 * | 8/2008 | Shih | 713/2 |

OTHER PUBLICATIONS

DMTF, "Platform Management Component Intercommunications (PMCI) Architecture", White Paper, Jun. 29, 2007.*

* cited by examiner

*Primary Examiner* — Fahmida Rahman
(74) *Attorney, Agent, or Firm* — Thomas | Horstemeyer, LLP

(57) ABSTRACT

A platform may comprise a management controller (MC) and a BIOS that may store SMBIOS information that may comprise metadata. SMBIOS information may be stored in the SMBIOS structure table. SMBIOS information may be transferred to the MC and may be communicated from the MC to an entity external to the platform. The BIOS may be inaccessible to the external entity. The MC may communicate with the external entity when the platform is powered ON or OFF. SMBIOS information may be transferred between the BIOS and the MC via a communication link. The MC and/or the BIOS may determine whether SMBIOS information from the MC is up-to-date. SMBIOS information may be copied from the BIOS to the MC if not up-to-date. SMBIOS information may be transferred via SMBIOS messages based on structure type, instance ID and/or handle.

32 Claims, 6 Drawing Sheets

METHOD AND SYSTEM FOR A PLATFORM LEVEL DATA MODEL AND MESSAGES FOR TRANSFERRING SMBIOS STRUCTURES AND DATA

CROSS-REFERENCE TO RELATED APPLICATIONS/INCORPORATION BY REFERENCE

This application makes reference to, claims priority to, and claims the benefit of U.S. Provisional Application Ser. No. 60/949,177, filed on Jul. 11, 2007, which is hereby incorporated herein by reference in its entirety.

FIELD OF THE INVENTION

Certain embodiments of the invention relate to communication. More specifically, certain embodiments of the invention relate to a method and system for a platform level data model and messages for transferring SMBIOS structures and data.

BACKGROUND OF THE INVENTION

Within a computer system or platform, a Basic Input Output System (BIOS) may comprise firmware code enabling the system to function when first powered on or initialized. Hardware and/or firmware components may be identified, initialized and loaded with software via the BIOS. System Management BIOS (SMBIOS) may work together with the BIOS interface. In this regard, "SMBIOS Reference Specification" from the Distributed Management Task Force (DMTF) may enable a standardized way of representing system management information with respect to platform hardware and firmware components. Moreover, SMBIOS may provide key platform asset information such as platform Universally Unique Identifier (UUID), BIOS version, processor family and/or processor speed, memory type and/or memory capacity. An SMBIOS structure table may be a low-level data model used to store platform asset information. Each SMBIOS structure may begin with a header which may comprise type, length, and handle. The SMBIOS structure table may be located in the upper 1 MB of real-mode memory for non Extensible Firmware Interface (EFI) systems. Instrumentation may deliver SMBIOS based inventory information using Common Information Model (CIM). An SMBIOS structure table may comprise platform asset management information, system health monitoring information, and a system event log.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and system for a platform level data model and messages for transferring SMBIOS structures and data, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a platform level data model and messages for transferring SMBIOS structures and data. Aspects of the method and system may comprise a communication link between a basic input output system (BIOS) on the one hand, and, on the other, an intelligent management device such as a management controller (MC) within a platform system or subsystem. A SMBIOS data model and messages for communicating SMBIOS information via the communication link may be indicated within an extension of the "SMBIOS Reference Specification". The SMBIOS information may comprise, for example, platform asset information, platform inventory data, platform asset management information, system health information and system events. The SMBIOS information may be maintained by the BIOS and stored in a master SMBIOS structure table within system memory for example. Copies of all or a portion of the SMBIOS master table may be transferred to the MC. The SMBIOS structure tables may comprise structures wherein each structure may be assigned a unique handle by the BIOS. The SMBIOS information transfers may be based on a plurality of models, for example, information may be transferred by entire table, by type of structure, by type of structure and instance ID and by handle. The SMBIOS information as well as metadata may be transferred via one or more SMBIOS messages between the system memory and the MC. The SMBIOS messages may be generated by the BIOS or the MC and each may initiate communication. Moreover, SMBIOS metadata may be utilized to compare the contents of one instance of the SMBIOS structure table with another instance; for example, the contents of the master SMBIOS structure table from system memory and the contents of a copied SMBIOS structure table from the MC. In some embodiments of the invention, entities external to the platform system or subsystem, for example, a remote management console, may exchange SMBIOS information with the MC. In this regard, the MC may be operable to communicate SMBIOS information with the external entity when the rest of the platform system or subsystem may be in either a powered ON or powered OFF state.

Figure 1:
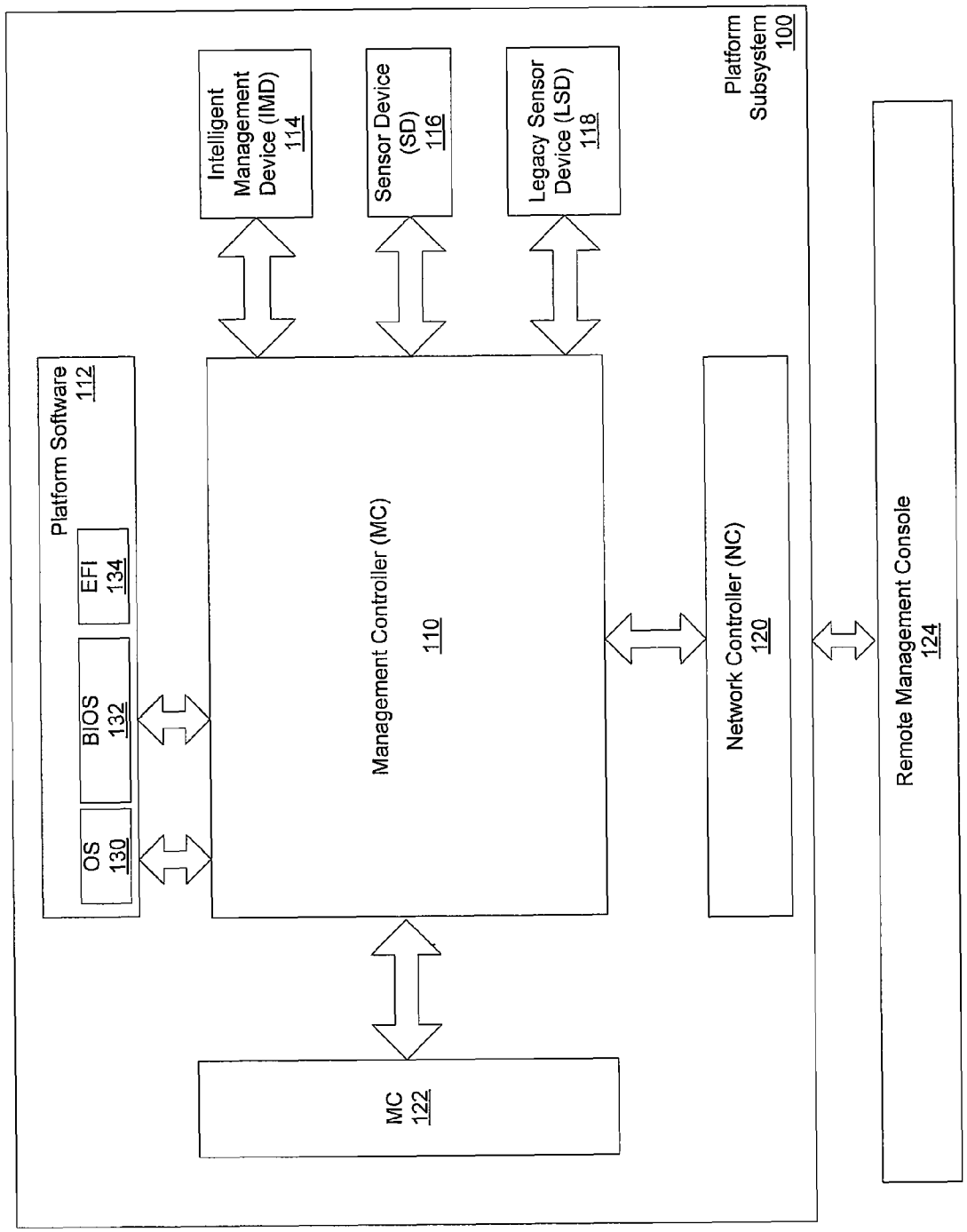
FIG. 1 is a block diagram of an exemplary management centric view of a platform subsystem and remote management console in accordance with an embodiment of the invention.

FIG. 1 is a block diagram of an exemplary management centric view of a platform subsystem and remote management console in accordance with an embodiment of the invention. Referring to FIG. 1, there is shown a platform subsystem 100 that may comprise a management controller (MC) 110, a MC 122, platform software 112, an intelligent management device (IMD) 114, a network controller (NC) 120, a BIOS 132, an operating system (OS) 130 and an extensible firmware interface (EFI) 134. In addition, there is shown a remote management console 124.

The management controller (MC) 110 may be a microcontroller, processor or intelligent management device that may aggregate management parameters from one or more management devices and may make access to those parameters available to local or remote software. The MC 110 may be communicatively coupled with the platform software 112, the network controller 120, the management device 114 and/or another management controller MC 122. The management controller 110 may comprise a copy of an SMBIOS structure table and corresponding metadata. The MC 110 may compare metadata received from a master SMBIOS structure table with its own metadata and determine whether its own copy of the SMBIOS structure table is up to date with the master SMBIOS structure table. The MC 110 may initiate communication with the BIOS 132 and may send and/or receive SMBIOS messages to and/or from the BIOS 132. Moreover, the MC 110 may communicate SMBIOS information to the remote management console 124 when the platform subsystem 100 may be in a powered on state or in a powered off state.

The platform software 112 may be running on a host CPU. The platform software 112 may comprise the BIOS 132, the OS 130 and EFI 134 for example. The platform software 112 may be communicatively coupled with the MC 110 and may perform management functions. In some embodiments of the invention the BIOS 132 may comprise firmware. Moreover, the BIOS 132 may maintain a master SMBIOS structure table comprising structures within a system memory. The BIOS 132 may assign a unique handle to SMBIOS structure table structures. In addition, the BIOS 132 may initiate communication with the MC 110 and may send and/or receive SMBIOS messages to and/or from the MC 110.

A plurality of management devices that may respond to management requests may be communicatively coupled with the MC 110. For example, the intelligent management device (IMD) 114 may enable management parameter access utilizing an abstracted interface and data model, the sensor device (SD) 116 may comprise a low level interface, and the legacy sensor device (LSD) 118 may utilize a register level, low level interface that may not be standardized. An exemplary management device may be a temperature sensor chip.

The network controller (NC) 120 may enable connectivity to one or more external networked entities. The NC 120 may be communicatively coupled with the MC 110 and the remote management console 124. The SMBIOS information may be transferred between the MC 110 and remote management console via the NC 120. In some embodiments of the invention, the MC 110 may be integrated within the NC 120.

The remote management console 124 may be communicatively coupled with the MC 110 via the NC 120. The remote management console 124 may be utilized to retrieve and aggregate system management information, for example, platform inventory data, from one or more platforms subsystems such as the platform subsystem 100. The common information model (CIM) defined by Distributed Management Task Force (DMTF) may be utilized to represent the inventory data. The retrieved system management information may be utilized to manage inventory and/or capacity of distributed systems for example. In some embodiments of the invention, the remote management console 124 may retrieve SMBIOS information from the MC 110. The remote management console 124 may receive SMBIOS information from the MC 110 when the platform subsystem 100 may be in a powered on state or in a powered off state.

In operation, management information related to hardware and firmware components within the platform subsystem 100 may be represented according to SMBIOS standard table structures. An SMBIOS structure table for the platform subsystem 100 may be maintained by the BIOS 132, stored within system memory and may comprise key asset information such as platform inventory data for a plurality of components such as MC 110 and 122, platform software 112, IMD 114, NC 120, BIOS 132, OS 130 and EFI 134 for example.

Moreover, the SMBIOS structure table may comprise platform asset management information, system health information and/or system events for example. The SMBIOS structure table or a portion of the table may be transferred among different components within the platform subsystem and/or to one or more external entities such as the remote management console 124 via the MC 110. In this regard, the SMBIOS structure table may be transferred to platform subsystem 100 components and external entities that may not have direct access to the master SMBIOS structure table stored within system memory. The SMBIOS information may be transferred to external entities such as the remote management console 124 when the platform subsystem 100 and/or a host CPU is powered down or powered up.

Figure 2:
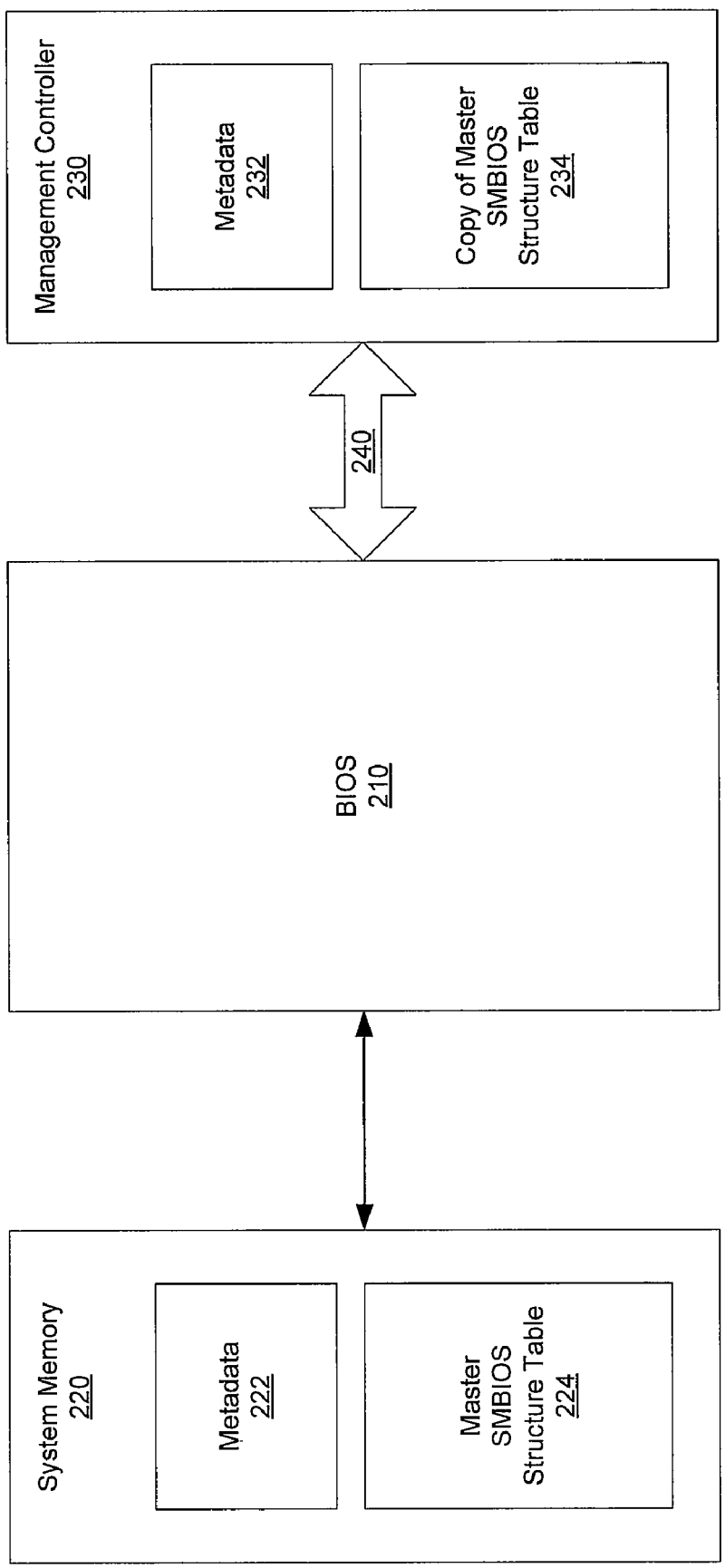
FIG. 2 is a block diagram of exemplary SMBIOS information and intercommunication among platform subsystem components, in accordance with an embodiment of the invention.

FIG. 2 is a block diagram of exemplary SMBIOS information and intercommunication among platform subsystem components, in accordance with an embodiment of the invention. Referring to FIG. 2, there is shown a system memory 220, metadata 222, a master system management basic input output system (SMBIOS) structure table 224, a BIOS 210, communication link 240, a management controller (MC) 230, metadata 232 and a copy of the master SMBIOS structure table 234.

The BIOS 210 may be similar or substantially the same as the BIOS 132 described in FIG. 1. The MC 230 may be similar or substantially the same as the MC 110 described in FIG. 1.

The system memory 220 may be a storage device utilized by the BIOS 210 to store and maintain the master SMBIOS structure table 224 and the metadata 222. The system memory 220 may be communicatively coupled with the BIOS 210 however; it may not be directly accessible from one or more other components within the platform subsystem 100 shown in FIG. 1 or from the remote management console 124.

The metadata 222 may be stored in system memory 220 and may comprise information about the master SMBIOS structure table 224. Metadata 232 may be stored in MC 230 and may comprise information about the copy of master SMBIOS structure table 234. For example, the metadata may comprise one or more of SMBIOS major version number, minor version number, structure size, structure table length, number of structures and SMBIOS structure table checksum. The metadata may be transferred between the system memory 220 and the MC 230 via SMBIOS messages.

The master SMBIOS structure table 224 may be created and maintained by the BIOS 210 and may be stored in system memory 220. The master SMBIOS structure table 224 may comprise key asset information such platform inventory data, platform asset management information, system health information and/or system events as described in FIG. 1 for example.

The copy of the master SMBIOS structure table 234 may be handled by the MC 230 and may comprise a portion or all of the information from the master SMBIOS structure table 224. The MC 230 or the BIOS 210 may determine whether the copy of the master SMBIOS structure table 234 is up to date and initiate transfer of a portion of or the entire master SMBIOS structure table 224 to the MC 230.

The communication link 240 may communicatively couple the BIOS 210 and MC 230. The communication link 240 may be, for example, a system management bus (SMbus) or a peripheral component interface-express (PCI-e) interface for example. The communication link 240 may enable messaging between the BIOS 210 and the MC 230.

In operation, SMBIOS information and/or metadata may be transferred via a plurality of messages and data models between system memory and the management controller (MC) 230. SMBIOS data may be transferred based on an SMBIOS command wherein the SMBIOS data may be broken down into portions and transferred within multiple messages. A transfer flag (TransferFlag) within the response may indicate which portion has been transferred. The transfer request may be identified by a data transfer handle (DataTransferHandle). A data integrity check may be enabled by the SMBIOS messages that may protect an entire data transfer.

SMBIOS messaging may be based on a set of Platform Management Components Intercommunications (PMCI) stack protocols that may enable intercommunication among platform components. Accordingly, the Management Component Transport Protocol (MCTP) communication model may comprise a message format, transport description, message exchange patterns and operational endpoint characteristics. A lower level layer protocol may bind the MCTP layer to a specific physical medium such as SMbus or PCI-e that may comprise the communication link 240 for example. Platform Level Data Model (PLDM) over MCTP defines data representations and commands that abstract platform management hardware.

In accordance with an embodiment of the invention, a GetSMBIOSStructureTableMetadata command may enable a platform component to retrieve SMBIOS structure table metadata information. For example, the BIOS 210 may retrieve metadata 232 from the MC 230 and/or the MC 230 may retrieve the metadata 222 from the system memory 220. In this regard, the BIOS 210 may query the MC 230 to determine the version of the copy of master SMBIOS structure table 234. Table 1 shows the request and response message format for the GetSMBIOSStructureTablemetadata command.

TABLE 1

GetSMBIOSStructureTablemetadata Command

| byte | Type | |
|---|---|---|
| | | Request Data |
| | | Response Data |
| 0 | enum8 | CompletionCode value: {BASE_CODES, NO_SMBIOS_TABLE_METADATA} |
| 1 | uint8 | SMBIOSMajorVersion |
| 2 | uint8 | SMBIOSMinorVersion |
| 3-4 | uint16 | MaximumStructureSize |
| 5-6 | uint16 | SMBIOSStructureTableLength |
| 7-8 | uint16 | NumSMBIOSStructures |
| 9-12 | uint32 | SMBIOSStructureTableIntegrityChecksum (CRC-32C) |

A SetSMBIOSStructureTable command may enable transfer of SMBIOS structure table information. For example, a platform software or firmware component may utilize this command to transfer the contents of the master SMBIOS structure table 224 to the MC 230. The entire contents of master SMBIOS structure table 224 may be transferred at one time or it may be broken down and transferred in portions wherein a TransferFlag may indicate which portion has been transferred. Table 2 show the request and response message format for the SetSMBIOSStructureTabledata command.

TABLE 2

SetSMBIOSStructureTable Command

| byte | type | |
|---|---|---|
| | | Request Data |
| 0:3 | uint32 | DataTransferHandle A handle that is used to identify SMBIOS structure table transfer. |
| 4 | enum8 | TransferFlag The transfer flag that indicates what part of the transfer this response represents. value: {start+end, start, middle, end} |
| Variable | — | SMBIOSTableData Response Data |
| 0 | enum8 | CompletionCode value: {BASE_CODES, INVALID_DATA_TRANSFER_HANDLE, INVALID_TRANSFER_FLAG, INVALID_SMBIOS_DATA_LENGTH, INVALID_SMBIOS_DATA_INTEGRITY_CHECK} |
| 1:4 | uint32 | NextDataTransferHandle A handle that is used to identify the next portion of SMBIOS structure table transfer. |

The contents of an SMBIOS structure table such as the master SMBIOS structure table 224 and copy of master SMBIOS structure table 234 may comprise structures. The SMBIOS messages that enable transfer of SMBIOS structure table structures may comprise contiguous bytes of both formatted and optional unformatted areas of a structure. Table 3 shows SMBIOS structure table data format and Table 4 shows SMBIOS structure representation in a PLDM message.

TABLE 3

SMBIOS Structure Table Data Format

| byte | type | Field |
|---|---|---|
| 0:1 | uint16 | SMBIOSStructureTableLength (L) |
| 2:L+1 | — | SMBIOS Structure Table with SMBIOS structures (see Table 4) |
| L+2:L+5 | uint32 | SMBIOSStructureTableIntegrityChecksum |

TABLE 4

SMBIOS Structure Representation

| byte | type | Field |
|---|---|---|
| 0 | uint8 | Type |
| 1 | uint8 | Length |
| 2-3 | uint16 | Handle |
| 4:L-1 | — | Rest of the formatted area of the structure |
| L:L+M-1 | — | M bytes of unformatted area of the structure |

The GetSMBIOSStructureTable command may be utilized to retrieve an SMBIOS structure table. For example, the MC 230 may retrieve the master SMBIOS structure table 224. Data transferred according to the GetSMBIOSStructureTable command may comprise structures represented within contiguous bytes of formatted and optional unformatted areas of the structure. The entire contents of master SMBIOS structure table 224 may be transferred at one time or it may be broken down and transferred in portions wherein a TransferFlag may indicate which portion has been transferred. Table 5 shows the request and response format for GetSMBIOSStructureTable.

table 224. The data transferred in response to GetSMBIOSStrucureByType may comprise every structure of an SMBIOS structure type within the master SMBIOS structure table 224. Both the formatted and optional unformatted areas

TABLE 5

| byte | type | GetSMBIOSStructureTable |
|---|---|---|
| | | Request Data |
| 0:3 | uint32 | DataTransferHandle<br>A handle that is used to identify SMBIOS structure table transfer. |
| 4 | enum8 | TransferFlag<br>The transfer flag that indicates whether this is the start of the transfer or not.<br>value: {start, non-start}<br>Response Data |
| 0 | enum8 | CompletionCode<br>value: {BASE_CODES,<br>SMBIOS_TABLE_UNAVAILABLE,<br>INVALID_DATA_TRANSFER_HANDLE} |
| 1:4 | uint32 | NextDataTransferHandle<br>A handle that is used to identify the next portion of SMBIOS table transfer. |
| 5 | enum8 | TransferFlag<br>The transfer flag that indicates what part of the transfer this response represents.<br>value: {start+end, start, middle, end} |
| Variable | — | SMBIOSTableData<br>See the structure below. |

In some embodiments of the invention, SMBIOS commands may initiate transfer of one or more SMBIOS structure table structures. In this regard, the GetSMBIOSStrucureByType command may enable one or more structures of a particular type to be read from the master SMBIOS structure of the structure may be transferred in contiguous bytes. Table 6 shows the request and response format for a GetSMBIOSStrucureByType command. The SMBIOS structure data format is shown in Table 7.

TABLE 6

| byte | type | GetSMBIOSStructureByType |
|---|---|---|
| | | Request Data |
| 0:3 | uint32 | DataTransferHandle<br>A handle that is used to identify SMBIOS structure table transfer. |
| 4 | enum8 | TransferFlag<br>The transfer flag that indicates whether this is the start of the transfer or not.<br>Value: {start, non-start} |
| 5 | uint8 | Type |
| 6-7 | uint16 | StructureInstanceID<br>A handle that is used to identify an instance of SMBIOS structure.<br>special values: 0xFFFF - All instances<br>Response Data |
| 0 | enum8 | CompletionCode<br>value: {BASE_CODES,<br>INVALID_DATA_TRANSFER_HANDLE,<br>INVALID_TRANSFER_FLAG,<br>NO_SMBIOS_STRUCTURES,<br>INVALID_SMBIOS_STRUCTURE_TYPE} |
| 1:4 | uint32 | NextDataTransferHandle<br>A handle that is used to identify the next portion of SMBIOS structure table transfer. |
| 5 | enum8 | TransferFlag<br>The transfer flag that indicates what part of the transfer this response represents.<br>Value: {start+end, start, middle, end} |
| Variable | — | SMBIOSStructureData (see Table 7) |

TABLE 7

SMBIOSStructureData Format

| byte | type | Field |
|---|---|---|
| 0:L−1 | — | SMBIOS structures (one or more) |
| L:L+3 | uint32 | SMBIOSStructureDataIntegrityChecksum |

The GetSMBIOSStructureByHandle command may be utilized to retrieve a structure by identifying the structure by handle within the command request for data. Structure handles may be assigned by the BIOS 210. Both formatted and optional unformatted areas of the structure requested by handle may be transferred within contiguous bytes of the message. Table 8 shows the request and response format for GetSMBIOSStructureByHandle.

TABLE 8

GetSMBIOSStructureByHandle

| byte | type | |
|---|---|---|
| | | Request Data |
| 0:3 | uint32 | DataTransferHandle<br>A handle that is used to identify SMBIOS structure table transfer. |
| 4 | enum8 | TransferFlag<br>The transfer flag that indicates whether this is the start of the transfer or not.<br>value: {start, non-start} |
| 5-6 | uint16 | SMBIOS Structure Handle |
| | | Response Data |
| 0 | enum8 | CompletionCode<br>value: {BASE_CODES,<br>INVALID_DATA_TRANSFER_HANDLE,<br>INVALID_TRANSFER_FLAG,<br>NO_SMBIOS_STRUCTURE,<br>INVALID_SMBIOS_STRUCTURE_HANDLE} |
| 1:4 | uint32 | NextDataTransferHandle<br>A handle that is used to identify the next portion of SMBIOS structure transfer. |
| 5 | enum8 | TransferFlag<br>The transfer flag that indicates what part of the transfer this response represents.<br>value: {start+end, start, middle, end} |
| Variable | — | SMBIOSStructureData (see Table 7) |

Figure 3A:
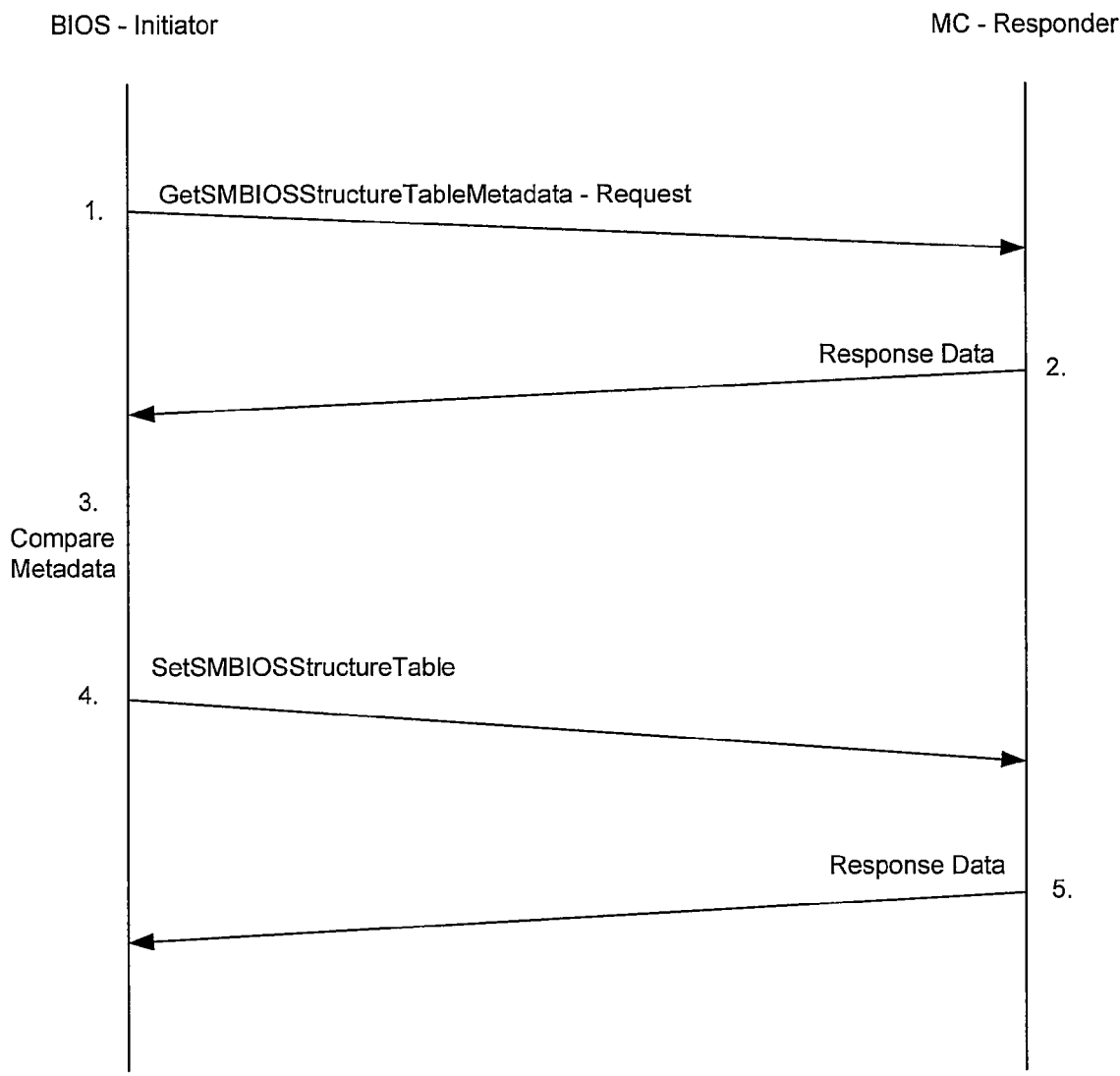
FIG. 3A is a flow diagram of an exemplary SMBIOS data transfer model that may enable a BIOS to push contents of an entire SMBIOS structure table to a management controller, in accordance with and embodiment of the invention.

FIG. 3A is a flow diagram of an exemplary SMBIOS data transfer model that may enable a BIOS to push contents of an entire SMBIOS structure table to a management controller, in accordance with and embodiment of the invention. Referring to FIG. 3A, the BIOS 210 may push the entire master SMBIOS structure table 224 to the MC 230 wherein the BIOS 210 may be the initiator of communication and the MC 230 may be the responder. In step 1, the BIOS 210 may send a GetSMBIOSStructureTableMetadata request shown in Table 1, to the MC 230. In step 2, the MC 230 may respond by sending the metadata 232 to the BIOS 210. For example, the MC 230 may send the response data shown in Table 1. In step 3, the BIOS 210 may perform a checksum and compare the received metadata 232 to the metadata 222 stored in system memory 220. If the metadata and the checksum from the system memory 220 and MC 230 match, then the MC 230 may comprise an up to date version of the SMBIOS structure table. If the metadata and the checksum from both the system memory 220 and MC 230 do not match then the BIOS 210 may push the master SMBIOS structure table 224 to the MC 230. In step 4, the BIOS 210 may send one or more SetSM-BIOSTable messages shown in Table 2, comprising the corresponding request data and all or a portion of the master SMBIOS structure table 224 to the MC 230. The BIOS 210 may indicate via a transfer flag (referred to as "TransferFlag" within Table 2), which portion of the master SMBIOS structure table 224 may be within each sent message. In step 5, the MC 230 may respond to the SetSMBIOSStructureTable command with the response data shown in Table 2 for example and may send a handle for the next data transfer (referred to as "NextDataTransferHandle" within Table 2) for each received SetSMBIOSTable message until the end of the contents of the master SMBIOS structure table 224 is received. In other words, the SetSMBIOSStructureTable request and response messages may loop until the entire contents of the master SMBIOS structure table 224 is received by the MC 230.

Figure 3B:
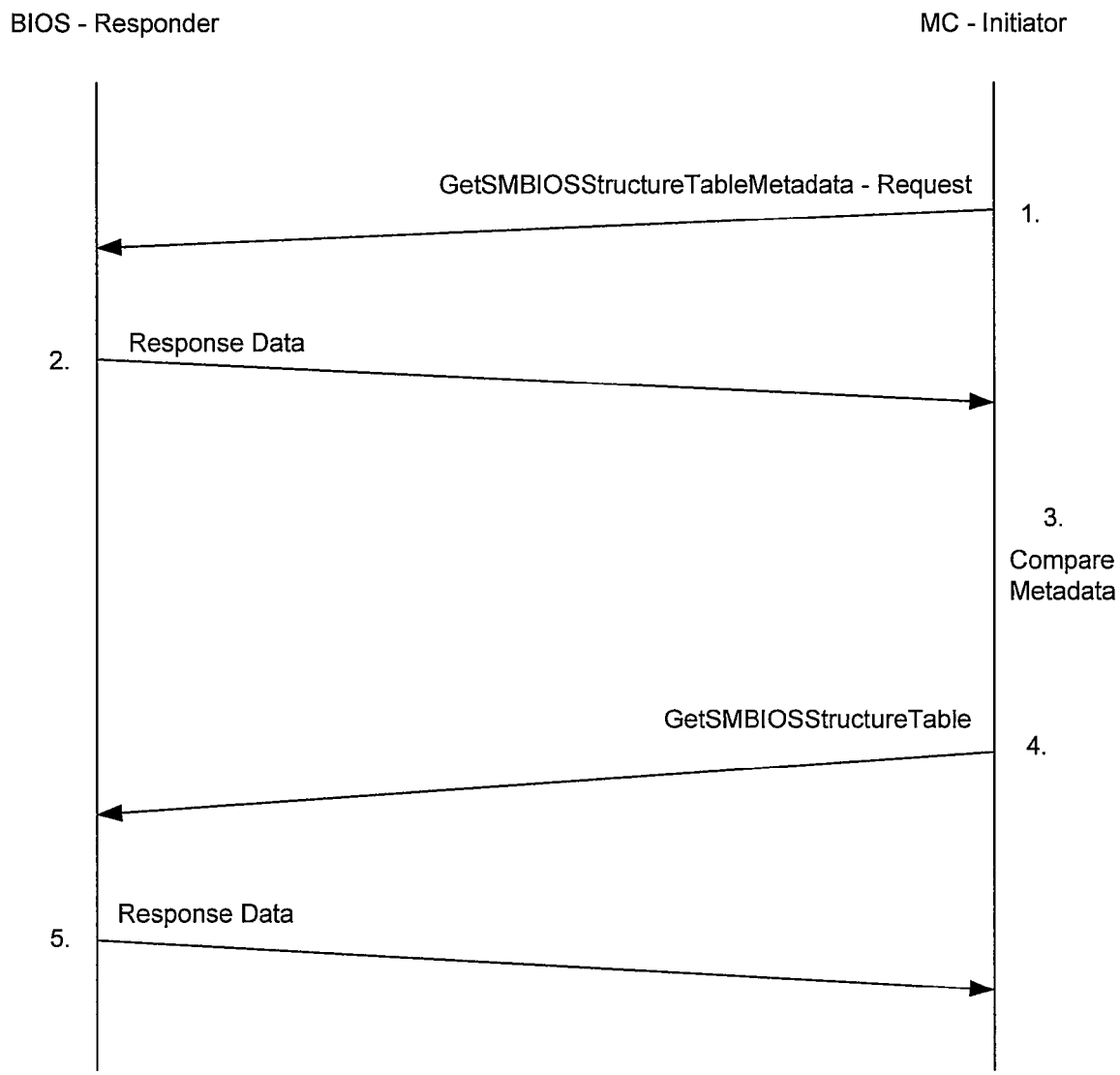
FIG. 3B is a flow diagram of an exemplary SMBIOS data transfer model that may enable a management controller to pull contents of an entire SMBIOS structure table via a BIOS, in accordance with and embodiment of the invention.

FIG. 3B is a flow diagram of an exemplary SMBIOS data transfer model that may enable a management controller to pull contents of an entire SMBIOS structure table via a BIOS, in accordance with and embodiment of the invention. Referring to FIG. 3B, the MC 230 may pull contents of an entire master SMBIOS structure table 224 via the BIOS 210 wherein the MC 230 may be the initiator of communication and the BIOS 210 may be the responder. In step 1, the MC 230 may send a GetSMBIOSStructureTableMetadata request shown in Table 1, to the BIOS 210. In step 2, the BIOS 210 may respond by sending the metadata 222 to the MC 230. For example, the BIOS 210 may send the response data shown in Table 1. In step 3, the MC 230 may perform a checksum and compare the received metadata 222 to the stored metadata 232. If the metadata and the checksum from the system memory 220 and MC 230 match, then the MC 230 may comprise an up to date version of the master SMBIOS structure table 224. If the metadata and the checksum from both the system memory 220 and MC 230 do not match then the MC 230 may pull the master SMBIOS structure table 224 to the MC 230. In step 4, the MC 230 may send one or more GetSMBIOSStructureTable messages comprising the corresponding request data shown in Table 5, to the BIOS 210. In step 5, the BIOS 210 may respond by sending contents of the entire master SMBIOS structure table 224 to the MC 230 via one or more messages. For example, the BIOS 210 may send the response data shown in Table 5. The BIOS 210 may indicate via a transfer flag (referred to as "TransferFlag"), which portion of the SMBIOS structure table is comprised within each message. Moreover, the BIOS 210 may indicate a handle for the next data transfer (referred to as "NextDataTransferHandle") for each received GetSMBIOSStructureTable message until the end of the contents of the master SMBIOS structure table 224 is sent. In other words, the GetSMBIOSStructureTable request and response messages may loop until the entire contents of the requested master SMBIOS structure table 224 is received by the MC 230.

Figure 3C:
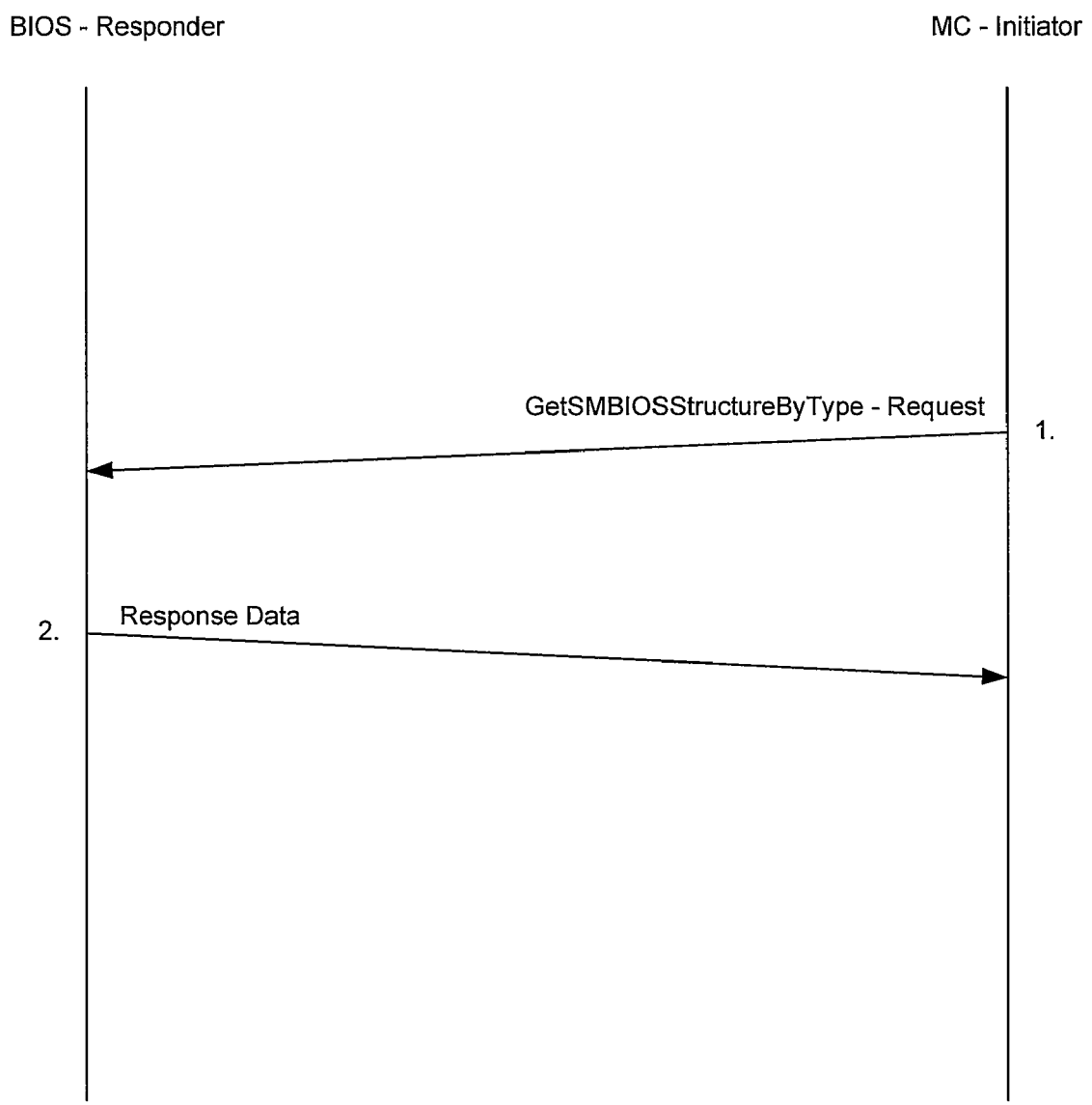
FIG. 3C is a flow diagram of an exemplary SMBIOS data transfer model that may enable a management controller to pull SMBIOS structure table structures by type via a BIOS, in accordance with and embodiment of the invention.

FIG. 3C is a flow diagram of an exemplary SMBIOS data transfer model that may enable a management controller to pull SMBIOS structure table structures by type via a BIOS, in accordance with and embodiment of the invention. Referring to FIG. 3C, the MC 230 may pull contents of one or more master SMBIOS structure table 224 structures by type via the BIOS 210 wherein the MC 230 may be the initiator of communication and the BIOS 210 may be the responder. In step 1, the MC 230 may send a GetSMBIOSStructureByType request that may comprise the request data shown in Table 6, to the BIOS 210. In this regard, a structure type (referred to as "Type" within Table 6) may be indicated within the request data. For example, a type may refer to one or more structures corresponding to a type of platform component such as a processor wherein some embodiments of the invention may comprise multiple processors and/or multiple processor type structures. Moreover, a structure instance identifier (referred to as "StructureInstanceID" within Table 6) may indicate which instance of the one or more structures are requested. In step 2, the BIOS 210 may respond by sending the response data shown in Table 6 comprising contents of the requested master SMBIOS structure table 224 structures to the MC 230 via one or more messages. The BIOS 210 may indicate via a transfer flag (TransferFlag), which portion of the requested master SMBIOS structure table 224 structure data is within each message. Moreover, the BIOS 210 may indicate a handle for the next data transfer (NextDataTransferHandle) for each received GetSMBIOSStructureByType message until the end of the contents of the master SMBIOS structure table 224 structure data is sent. In other words, the GetSMBIOSStructureByType request and response messages may loop until the entire contents of the requested master SMBIOS structure table 224 structure data is received by the MC 230.

Figure 3D:
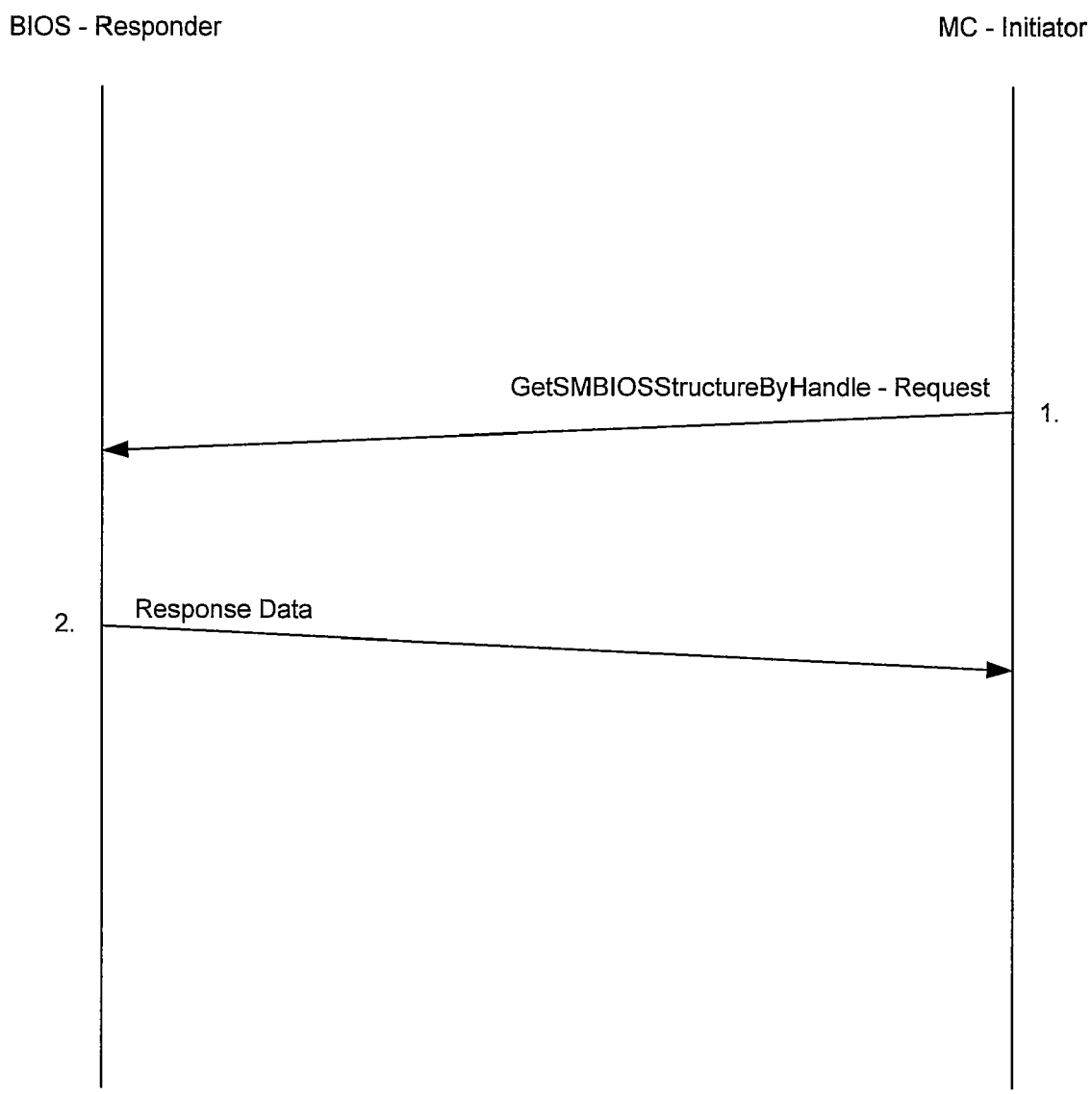
FIG. 3D is a flow diagram of an exemplary SMBIOS data transfer model that may enable a management controller to pull SMBIOS structure table structures by handle via a BIOS, in accordance with and embodiment of the invention.

FIG. 3D is a flow diagram of an exemplary SMBIOS data transfer model that may enable a management controller to pull SMBIOS structure table structures by handle via a BIOS, in accordance with and embodiment of the invention. Referring to FIG. 3D, the MC 230 may pull contents of one or more master SMBIOS structure table 224 structures by a handle (referred to as "Handle" within Table 8) via the BIOS 210 wherein the MC 230 may be the initiator of communication and the BIOS 210 may be the responder. Accordingly, SMBIOS structures within the master SMBIOS structure table 224 may be assigned the handle by the BIOS 210. In step 1, the MC 230 may send a GetSMBIOSStructureByHandle request that may comprise the request data shown in Table 8, to the BIOS 210. In this regard, the handle may be indicated within the request data. In step 2, the BIOS 210 may respond by sending the response data shown in Table 8 comprising contents of the requested master SMBIOS structure table 224 structures to the MC 230 via one or more messages. The BIOS 210 may indicate via a transfer flag (TransferFlag), which portion of the requested master SMBIOS structure table 224 structure data is comprised within each message. Moreover, the BIOS 210 may indicate a data transfer handle for the next data transfer (NextDataTransferHandle) for each received GetSMBIOSStructureByHandle message until the end of the requested contents of the master SMBIOS structure table 224 structure data is sent. In other words, the GetSMBIOSStructureByHandle request and response messages may loop until the entire contents of the requested master SMBIOS structure table 224 structure data may be received by the MC 230.

In an embodiment of the invention, a platform 100 may comprise a management controller (MC) 230 and a BIOS 210 that may store SMBIOS information. The SMBIOS information may comprise system information for the platform 100 and/or corresponding metadata. At least a portion of the SMBIOS information may be transferred to the MC 230. In addition, the at least a portion of the SMBIOS information may be communicated from the MC 230 to an entity external to the platform such as the remote management console 124. In this regard, the BIOS 210 may be inaccessible to the entity external to the platform 100. Moreover, the MC 230 may communicate with the entity external to the platform independent of whether the platform 230 is powered ON or OFF. At least a portion of the SMBIOS information may be transferred between the BIOS 210 and the MC 230 via a communication link 240. The MC may acquire SMBIOS information from the BIOS 210 and the MC 230 may determine whether its stored SMBIOS information is up-to-date. Accordingly, SMBIOS information may be copied from the BIOS 210 to the MC 230 when the MC 230 SMBIOS information is not up-to-date. In addition, the BIOS 210 may acquire SMBIOS information from the MC 230 and may determine whether the acquired SMBIOS information is up-to-date. In this regard, specified SMBIOS information may be copied from the BIOS 210 to the MC 230 when the acquired SMBIOS information is not up-to-date. At least a portion of the SMBIOS information may be transferred via one or more SMBIOS messages based on one or more of a structure type, an instance ID and a handle.

Certain embodiments of the invention may comprise a machine-readable storage having stored thereon, a computer program having at least one code section for a platform level data model and messages for transferring SMBIOS structures and data, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method comprising:
in a platform subsystem of a host device, the platform subsystem comprising a plurality of platform subsystem components, wherein one or more of said plurality of platform subsystem components stores system management basic input output system (SMBIOS) information, said stored SMBIOS information comprising system information for said platform subsystem, corresponding metadata, or any combination thereof:
communicating at least a portion of said SMBIOS information from a first of said plurality of platform subsystem components to one or more other of said plurality of platform subsystem components, wherein said at least a portion of said SMBIOS information is communicated:
in one or more messages communicated via a protocol layer above a physical layer, said one or more messages being communicated based on a Management Component Transport Protocol (MCTP); and
via a communication link between said first of said plurality of platform subsystem components and said one or more other of said plurality of platform subsystem components; and
communicating said SMBIOS information from a management controller (MC) of said platform subsystem to an entity external to said platform subsystem independent of whether said platform subsystem is powered ON or powered OFF when a platform subsystem basic input output system (BIOS) comprising said SMBIOS information is inaccessible by said entity.

2. The method according to claim 1, comprising communicating said at least said portion of said SMBIOS information from the platform subsystem BIOS to the MC in said one or more messages communicated via said protocol layer above the physical layer via the communication link between said platform subsystem BIOS and said MC.

3. The method according to claim 2, comprising acquiring said at least said portion of said SMBIOS information from said platform subsystem BIOS by said MC.

4. The method according to claim 2, comprising determining whether said stored SMBIOS information for said MC is up-to-date.

5. The method according to claim 2, comprising copying specified SMBIOS information from said platform subsystem BIOS to said MC in instances when said stored SMBIOS information for said MC is not up-to-date.

6. The method according to claim 2, comprising acquiring SMBIOS information from said MC by said platform subsystem BIOS, wherein said SMBIOS information is stored in said MC.

7. The method according to claim 6, comprising determining whether said acquired SMBIOS information from said MC is up-to-date.

8. The method according to claim 7, comprising copying specified SMBIOS information from said platform subsystem BIOS to said MC in instances when said acquired SMBIOS information is not up-to-date.

9. The method according to claim 1, comprising identifying, transferring, or both identifying and transferring said at least said portion of said SMBIOS information via one or more messages.

10. The method according to claim 1, comprising identifying, transferring, or both identifying and transferring said at least said portion of said SMBIOS information via one or more messages based on one or more of a structure type, an instance identifier, or a handle.

11. The method according to claim 1, wherein said one or more messages communicated via said protocol layer above the physical layer are communicated based on a MCTP communication model comprising one or more of a message format, transport description, message exchange patterns, or operation endpoint characteristics.

12. The method according to claim 11, wherein said protocol layer above said physical layer, via which said MCTP communication model messages are communicated, is bound to a specific physical medium comprising said communication link.

13. A system, comprising:
one or more circuits for use in a platform subsystem of a host device, the platform subsystem comprising a plurality of platform subsystem components, wherein:
one or more of said plurality of platform subsystem components stores system management basic input output system (SMBIOS) information, said stored SMBIOS information comprising system information for said platform subsystem, corresponding metadata, or any combination thereof;
said one or more circuits enables communication of at least a portion of said SMBIOS information from a first of said plurality of platform subsystem components to one or more other of said plurality of platform subsystem components, wherein said at least a portion of said SMBIOS information is communicated:
in one or more messages communicated via a protocol layer above a physical layer, said one or more messages being communicated based on a Management Component Transport Protocol (MCTP); and
via a communication link between said first of said plurality of platform subsystem components and said one or more other of said plurality of platform subsystem components; and
said one or more circuits enables communication of said SMBIOS information from a management controller (MC) of said platform subsystem to an entity external to said platform subsystem independent of whether said platform subsystem is powered ON or powered OFF when a platform subsystem basic input output system (BIOS) comprising said SMBIOS information is inaccessible by said entity.

14. The system according to claim 13, wherein said one or more circuits enables communication of said at least said portion of said SMBIOS information from the platform subsystem BIOS to the MC in said one or more messages communicated via said protocol layer above the physical layer via the communication link between said platform subsystem BIOS and said MC.

15. The system according to claim 14, wherein said one or more circuits enables acquisition of said at least said portion of said SMBIOS information from said platform subsystem BIOS by said MC.

16. The system according to claim 14, wherein said one or more circuits enables determination of whether said stored SMBIOS information for said MC is up-to-date.

17. The system according to claim 14, wherein said one or more circuits is enabled to copy specified SMBIOS information from said platform subsystem BIOS to said MC in instances when said stored SMBIOS information for said MC is not up-to date.

18. The system according to claim 14, wherein said one or more circuits enables acquisition of SMBIOS information from said MC by said platform subsystem BIOS, wherein said SMBIOS information is stored in said MC.

19. The system according to claim 18, wherein said one or more circuits enables determination of whether said acquired SMBIOS information from said MC is up-to-date.

20. The system according to claim 19, wherein said one or more circuits is enabled to copy specified SMBIOS information from said platform subsystem BIOS to said MC in instances when said acquired SMBIOS information is not up-to-date.

21. The system according to claim 13, wherein said one or more circuits enables identification, transfer, or both identification and transfer of said at least said portion of said SMBIOS information via one or more messages.

22. The system according to claim 13, wherein said one or more circuits enables identification, transfer, or both identification and transfer of said at least said portion of said SMBIOS information via one or more messages based on one or more of a structure type, an instance identifier, or a handle.

23. A non-transitory machine-readable storage having stored thereon, a computer program having at least one code section for managing data, the at least one code section being executable by a machine for causing the machine to perform steps comprising:

in a platform subsystem of a host device, the platform subsystem comprising a plurality of platform subsystem components, wherein one or more of said plurality of platform subsystem components stores system management basic input output system (SMBIOS) information, said stored SMBIOS information comprising system information for said platform subsystem, corresponding metadata, or any combination thereof:

communicating at least a portion of said SMBIOS information from a first of said plurality of platform subsystem components to one or more other of said plurality of platform subsystem components, wherein said at least a portion of said SMBIOS information is communicated:

in one or more messages communicated via a protocol layer above a physical layer, said one or more messages being communicated based on a Management Component Transport Protocol (MCTP); and via a communication link between said first of said plurality of platform subsystem components and said one or more other of said plurality of platform subsystem components; and communicating said SMBIOS information from a management controller (MC) of said platform subsystem to an entity external to said platform subsystem independent of whether said platform subsystem is powered ON or powered OFF when a platform subsystem basic input output system (BIOS) comprising said SMBIOS information is inaccessible by said entity.

24. The non-transitory machine-readable storage according to claim 23, wherein said at least one code section comprises code that enables identifying, transferring, or both identifying and transferring said at least said portion of said SMBIOS information via one or more messages.

25. The non-transitory machine-readable storage according to claim 23, wherein said at least one code section comprises code that enables identifying, transferring, or both identifying and transferring said at least said portion of said SMBIOS information via one or more messages based on one or more of a structure type, an instance identifier, or a handle.

26. The non-transitory machine-readable storage according to claim 23, wherein said at least one code section comprises code that enables communicating said at least said portion of said SMBIOS information from the platform subsystem BIOS to the MC in said one or more messages communicated via said protocol layer above the physical layer via the communication link between said platform subsystem BIOS and said MC.

27. The non-transitory machine-readable storage according to claim 26, wherein said at least one code section comprises code that enables acquiring said at least said portion of said SMBIOS information from said platform subsystem BIOS by said MC.

28. The non-transitory machine-readable storage according to claim 26, wherein said at least one code section comprises code that enables determining whether said stored SMBIOS information for said MC is up-to-date.

29. The non-transitory machine-readable storage according to claim 26, wherein said at least one code section comprises code that enables copying specified SMBIOS information from said platform subsystem BIOS to said MC in instances when said stored SMBIOS information for said MC is not up-to-date.

30. The non-transitory machine-readable storage according to claim 26, wherein said at least one code section comprises code that enables acquiring SMBIOS information from said MC by said platform subsystem BIOS, wherein said SMBIOS information is stored in said MC.

31. The non-transitory machine-readable storage according to claim 30, wherein said at least one code section comprises code that enables determining whether said acquired SMBIOS information from said MC is up-to date.

32. The non-transitory machine-readable storage according to claim 31, wherein said at least one code section comprises code that enables copying specified SMBIOS information from said platform subsystem BIOS to said MC in instances when said acquired SMBIOS information is not up-to-date.

* * * * *